No. 851,554. PATENTED APR. 23, 1907.
A. F. NIMS.
CONCRETE MEASURING MACHINE.
APPLICATION FILED MAY 26, 1906.
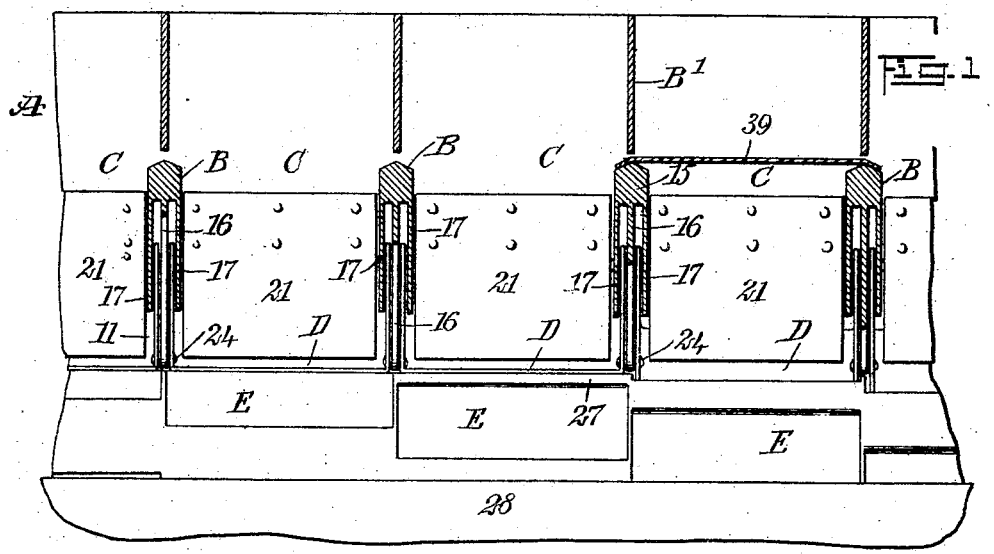
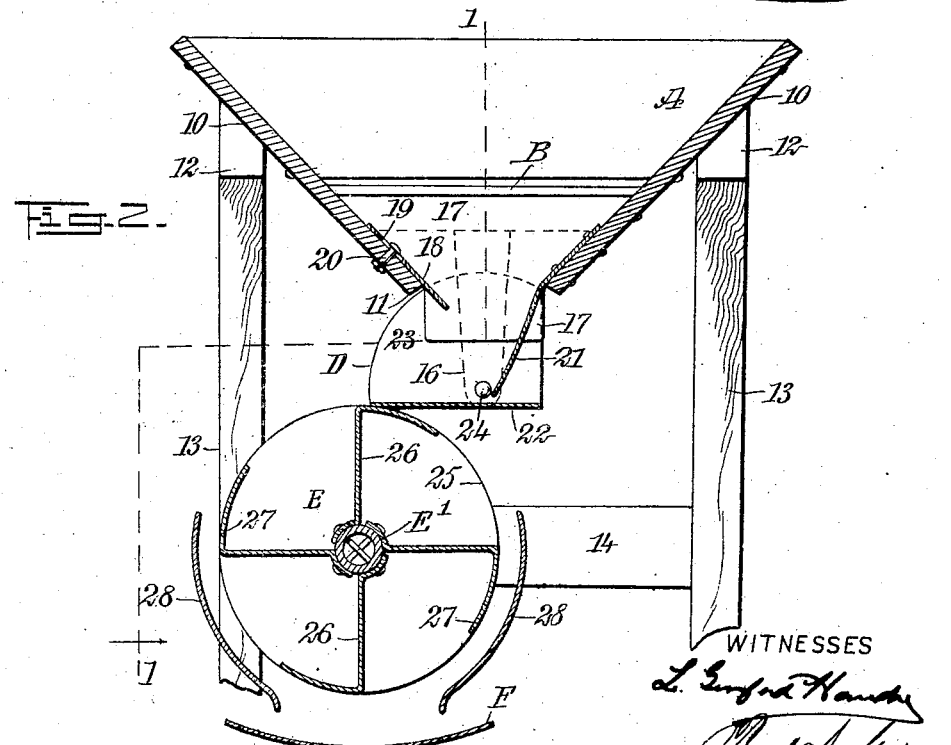
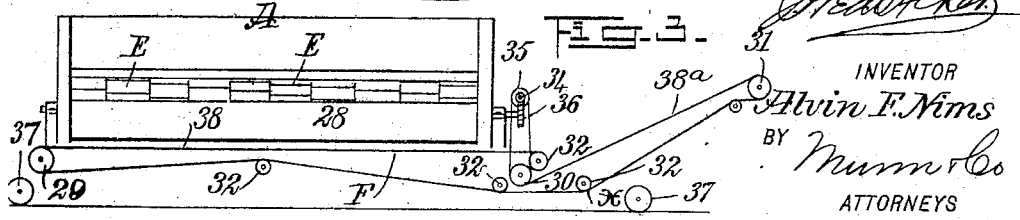
WITNESSES
INVENTOR
Alvin F. Nims
BY Munn & Co.
ATTORNEYS

UNITED STATES PATENT OFFICE.

ALVIN F. NIMS, OF PHILADELPHIA, NEW YORK.

CONCRETE-MEASURING MACHINE.

No. 851,554.     Specification of Letters Patent.     Patented April 23, 1907.

Application filed May 26, 1906. Serial No. 318,845.

*To all whom it may concern:*

Be it known that I, ALVIN F. NIMS, a citizen of the United States, and a resident of Philadelphia, in the county of Jefferson and State of New York, have invented a new and Improved Concrete-Measuring Machine, of which the following is a full, clear, and exact description.

The purpose of the invention is to provide a very simple, durable, economic and effective machine for measuring concrete or concrete mixtures, or the like, and for delivering the measured material to any desired receiver; which machine is portable and low, enabling material to be easily shoveled into it or dumped therein from wheel-barrows with the assistance of low platforms.

Another purpose of the invention is to provide the hopper with permanent low partitions and removable extension partitions, thus dividing the hopper into a series of compartments, all of which may contain the same material, or different material or mixtures, and also to provide each compartment with an independent bucket or measuring wheel and means for temporarily closing any one or more compartments, whereby each compartment and its measuring wheel is rendered independent of the others, and all or any desired number may be simultaneously brought into action.

Another purpose of the invention is to provide a conveyer arranged to receive the material discharged from all the measuring wheels, and to provide an independent dumping chute for each compartment, adapted to deliver the material therefrom to the measuring wheel, which dumping chutes are automatically operated by the measuring wheels, being so constructed and arranged as to deliver just sufficient material to a bucket of the measuring wheel as to practically fill it.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a longitudinal vertical section through a portion of the machine, the section being taken practically on the line 1—1 of Fig. 2; Fig. 2 is a transverse vertical section through one of the compartments, its dumping chute and measuring wheel, and the conveyer belt; and Fig. 3 is a side elevation of the complete machine, drawn upon a small scale and illustrating diagrammatically the conveyer belt, its supports and a driving mechanism for the shaft carrying the measuring wheels.

A represents a hopper, which may be of any desired length, the sides 10 of the hopper being inclined from the top downward in direction of each other to an extent which will leave a space 11 between their lower edges, as is shown in Fig. 2. This hopper may be supported in any suitable or approved manner; as shown a framework is employed, consisting of upper longitudinal beams 12, vertical supporting beams 13 and transverse beams 14. The hopper A is permanently divided into a series of compartments C by partitions B, which partitions do not extend to the upper edge of the hopper as is shown in both Figs. 1 and 2. In connection with these partitions B upper removable partitions B' may be employed when it is desired to increase the capacity of the compartments.

Each of the main partitions B consists of an upper solid section 15 whose upper surface is preferably inclined from the center downward in direction of its sides; and from the upper solid section 15 a hanger 16 is carried downward, which hanger is of sufficient length to pass through the opening 11 and some distance below it, as is best shown by dotted lines in Fig. 2; and in the further construction of the main partition B side slabs 17 are employed, which extend down from the said solid section 15 parallel with its sides. These slabs 17 extend down through the opening 11 in the hopper, but not to the extent of the hanger 16, as is also shown in Figs. 1 and 2; and the slabs 17 are practically of the same width as the width of the opening 11 through which they pass.

A plate 18 is mounted to slide on the inner face of the forward side section of the hopper A, and to extend when desired below the lower edge of said side section, as is shown in Fig. 2, so as to lessen the width of the opening 11 to suit different material passing through it. To that end the adjustable plate 18 is provided with a slot 19 through which a suitable bolt 20 is passed for holding the plate in adjusted position.

At the opposite side of the hopper an agitating plate 21 is secured to the inner face of the hopper, and this agitating plate extends downwardly and forwardly to a greater or lesser extent, and is constructed of a spring material. Both of the plates 18 and 21 are of substantially the same width as the width of the compartment in which they are placed.

In connection with each compartment C a dumping chute D is employed. This chute consists of a bottom 22 and sides 23, the chute being open at its forward end, at its top and at its rear, and each chute is pivoted to the hangers 16 between its center and its rear end by means of suitable pivot bolts 24. The inclination of the agitating plate 21 in each compartment is preferably such that the lower ends of the agitating plates will be just to the rear of the pivots 24 and clear of the bottom 22 of the dumping chutes when in their horizontal or receiving position shown in Fig. 2.

A measuring wheel E is provided for each compartment C, and these measuring wheels are located beneath the dumping chutes D and are substantially of the same width as the width of the compartment in connection with which they co-operate. In the preferred construction of a measuring wheel E it consists of side members 25 secured upon a line shaft E' common to all of the wheels, and partitions 26 also secured to said shaft and extending to the peripheral portion of the sides 25 and from one side to the other, dividing each wheel into a series of buckets. Usually four of such buckets are provided for as is shown in Fig. 2. At the outer end of each of the partitions 26 a wing or flange 27 is formed, which follows the contour of the peripheral portion of the sides, and is of such length as to close slightly more than one-half of the width of the mouth of a bucket.

In the arrangement of the partitions 26 when forming the various measuring wheels E, the partitions of the wheels in their order from right to left, or vice versa, are set back, so that corresponding partitions in consecutive wheels will have a stepped arrangement. Such an arrangement is provided for in order that the corresponding buckets of all of the wheels shall not dump their contents at the same time.

I desire it further to be understood that each measuring wheel E may be provided with an independent hub and be secured to its shaft in any approved manner.

The dumping chutes D are held in their normal horizontal position shown in Fig. 2, by engagement at their lower bottom portions with the outer faces of the wings or flanges 27 of the measuring wheels, and when the chutes D are released from such engagement with said wings or flanges 27 of the wheels E, the chutes will automatically drop at their forward ends, entering the open ends of the buckets beneath them and emptying their contents into the same; and by the time that the next flange or wing 27 engages with a chute D to elevate the same to normal position, the chute will have discharged just sufficient material into the bucket to fill the latter.

Forward and rear stationary curved shields 28 are secured in the framework and are spaced a suitable distance from the peripheral surfaces of all of the wheels, serving to direct the contents of the buckets in the wheels on to a troughing belt F, which is shown in its entirety in Figs. 3 and in section in Fig. 2. This troughing belt is passed over suitable drums 29, 30 and 31, the drum 29 being at one end of the machine and the drum 31 some distance removed from the opposite end of the machine, as the stretch of the belt passing over the drum 31 is the discharging stretch and is adapted to deliver the material into any desired receiver. The upper or receiving stretch of the belt F, which is beneath the measuring wheels E, is straight or horizontal, whereas the delivering or discharging stretch is given an upward and downward inclination.

The belt is passed over suitably placed idlers 32 and is continuous or endless; and the driving of the belt is accomplished through the medium of the intermediate drum 30, which is driven from a shaft 34 connected with any suitable source of power, on which shaft a worm 35 is formed, engaging with a worm wheel 36 at one end of the line shaft E'. This worm gearing is not utilized for driving purposes, but is employed for regulating purposes, since the weight of the material being all on one side of the measuring wheels no power is required to turn them. In fact, they would run away if no regulating gear were employed.

The measured material is received upon the upper horizontal stretch 38 of the belt F, and is delivered to the inclined stretch 38ª from which it is discharged, as has been mentioned; but I desire it to be understood that usually one of the idlers 32, designated as $x$, has a flexible or hinged support, enabling the outer or delivery end of the conveyer belt to be raised or lowered to facilitate the delivery of any kind of material to the mixer for example.

The machine is portable, being usually provided with supporting wheels 37 diagrammatically shown in Fig. 3, and is made low in order that material may be readily deposited therein. The machine will accurately measure all kinds of material usually employed in concrete construction and will deliver it to any kind of concrete mixer. Any kind of mixture can be obtained and delivered to the belt F. For example, the first compartment C in the hopper can contain either cement, sand or stone, and likewise any other compartment. The stone is placed in the first six compartments for example and sand in the preceding three compartments, the remaining or tenth compartment being closed. The stone will have a thin layer of sand over it when deposited on the conveyer belt, and if cement is placed in the last or tenth compartment, the entire deposited mass will have a thin layer of cement over the stone and sand; or the order may be changed or include as many different mixtures as there are measuring wheels and chutes.

Any compartment C may be adapted to any of the materials mentioned, by suitably adjusting the plate 18 therein, and any compartment may be closed by placing a cover 39 over it as is shown in Fig. 1, which cover is shaped to rest upon the inclined upper faces of opposing partitions B.

As a measuring wheel revolves, the material is deposited very gradually upon the conveyer belt, and before a bucket in the wheel is emptied another commences to discharge. By the arrangement of the buckets in the measuring wheels heretofore described, that is, where each section of four buckets is placed a little circumferentially ahead of the others, no two buckets commence to discharge at the same time, and by this means the material is delivered very universally and is also evenly distributed.

As a measuring wheel E revolves, the accompanying chute D will drop into the bucket as the chute is released from the flange or wing 27 accompanying the bucket; and as the chute D inclines downward and forward, the lower back portion of the chute will strike the agitating plate 21 and agitate the material lodged against it and consequently the material in the compartment above it, whereupon the material will slide down the chute into the bucket until the bucket is filled. At such time the material will not slide out further from the chute, owing to the fact that the incline of the chute when down is that of about forty-five degrees from the horizontal, which is very close to the angle of repose for most concrete material.

It will be observed that the sides 21 of the chutes D move in the spaces between the slabs 17 and the hangers 16. This arrangement is made in order that there shall be no spilling of the material as it passes from the compartment C on to the chute D.

Having thus described my invention, I claim as new, and desire to secure by Letters Patent,—

1. In concrete measuring machines, a hopper having an outlet, a dumping chute pivoted beneath the outlet, an agitating device operated by the chute, and a measuring wheel provided with a series of buckets mounted to revolve beneath the chute and to control its cut-off and dumping position relatively to the hopper.

2. In concrete measuring machines, a hopper provided with an outlet, means for regulating the extent of said outlet, a dumping chute pivoted below the outlet, an agitating plate secured to the said hopper opposite the said regulating means, which agitating plate is of spring material and extends down into the chute adjacent to the rear of its pivot, a measuring wheel mounted to revolve below the said chute, which measuring wheel is provided with a series of buckets and marginal flanges at the buckets, partially closing their mouths, which flanges are adapted for engagement with the chute to hold the same in normal position, the chute dropping into the open portions of the buckets when relieved from engagement with the flanges of the wheel, and a retarding mechanism for the said measuring wheel.

3. In concrete measuring machines, a hopper provided with an outlet, means for regulating the extent of said outlet, a dumping chute pivoted below the outlet, an agitating plate secured to the said hopper opposite the said regulating means, which agitating plate is of spring material and extends down into the chute adjacent to the rear of its pivot, a measuring wheel mounted to revolve below the said chute, which measuring wheel is provided with a series of buckets and marginal flanges at the buckets partially closing their mouths, which flanges are adapted for engagement with the chutes to hold the same in normal position, the chute dropping into the open portions of the buckets when relieved from engagement with the flanges of the wheel, a retarding mechanism for the said measuring wheel, shields located at opposite sides of the said wheel, and a conveyer located below the shields and the wheel.

4. In a concrete measuring machine, a hopper, fixed partitions dividing said hopper into a series of compartments, each compartment comprising an upper solid section, a central hanger and a slab at each side of the hanger, removable partitions fitted in the hopper above the fixed partitions, chutes pivotally connected with the hangers of the fixed partitions, the pivots for the said chutes being between their centers and their rear portions, a plate adjustably mounted in each compartment at the forward wall of the hopper, whereby to increase or decrease the size of the outlet openings for the compartments, a spring agitating plate located in each compartment at the inner side of the hopper opposite the said adjustable plate, which spring plates extend down into the chutes to a position at the rear of their pivots, measuring wheels mounted to revolve, one below each of the said chutes, each measuring wheel being provided with a series of buckets and each bucket with a marginal flange which is adapted to engage with the lower forward portion of the chute above it, whereby to raise the said chute to a normal position or permit it to drop into dumping position into one of the buckets, the buckets in the series of wheels being so arranged that the buckets of one wheel will be stepped relatively to the buckets of the next wheel, shields at the front and the rear portions of the said measuring wheels, spaced therefrom, a conveyer belt mounted to revolve beneath the series of measuring wheels, a driving shaft, a driving connection between the said shaft and the said belt, and a retarding mechanism for the measuring wheels operated from the said shaft.

5. In a concrete measuring machine, a hopper, a revoluble measuring wheel provided with pockets, a chute pivoted intermediate of the ends thereof below the hopper, and an agitating plate secured to the hopper and extending into the chute to be engaged thereby when in dumping position.

6. In a concrete measuring machine, a hopper, a dumping chute beneath the hopper, a revoluble measuring wheel having pockets into which the chute discharges, a driven shaft and a retarding device for the measuring wheel, operated by said shaft.

7. In a concrete measuring machine, a hopper, a dumping chute beneath the hopper, a measuring wheel provided with pockets into which the chute discharges, and a retarding device for the measuring wheel, comprising a worm on a driven shaft and a worm wheel on the shaft of the measuring wheel.

8. In a concrete measuring machine, a hopper, a dumping chute below the hopper, a measuring wheel provided with pockets into which the chute discharges, a conveyer beneath the measuring wheel, a driven shaft provided with a worm, a worm wheel on the shaft of the measuring wheel and with which the worm meshes, and means for operating the conveyer from said driven shaft.

9. In a concrete measuring machine, a plurality of hoppers, a dumping chute beneath each hopper, and a measuring wheel beneath each chute and provided with pockets into which the chutes discharge, the pockets of the wheels being so arranged that the pockets of one wheel will be stepped relatively to the pockets of the next wheel.

10. In a concrete measuring machine, a hopper having each of its end walls provided with parallel and spaced members, one of which projects below the other, and a dumping chute pivoted to the projecting members of the hopper with its sides extending between the said members.

In testimony whereof I have signed my name to this specification in the presence of two subscribing witnesses:

ALVIN F. NIMS.

Witnesses:
J. F. LA RUE,
W. A. MARKWICK.